United States Patent [19]

Teramachi

[11] Patent Number: 4,788,477
[45] Date of Patent: Nov. 29, 1988

[54] LINEAR MOTOR-DRIVEN X-Y TABLE

[76] Inventor: Hiroshi Teramachi, 2-34-8, Higashi-Tamagawa, Setagaya-Ku, Tokyo, Japan

[21] Appl. No.: 886,697

[22] Filed: Jul. 18, 1986

[30] Foreign Application Priority Data

Jul. 26, 1985 [JP]   Japan .................. 60-165297

[51] Int. Cl.$^4$ .................. H02K 41/02; F16C 29/06
[52] U.S. Cl. .................. 318/135; 310/12; 310/166
[58] Field of Search .................. 318/37, 38, 135, 115; 310/12–14, 90, 166

[56] References Cited

U.S. PATENT DOCUMENTS

| 3,716,731 | 2/1973 | Nilsson | 310/13 |
| 3,857,075 | 12/1974 | Sawyer | 310/12 X |
| 3,881,139 | 4/1978 | Inaba et al. | 310/12 X |
| 3,904,900 | 9/1975 | Shichida et al. | 318/38 X |
| 3,906,262 | 9/1975 | Shichida et al. | 318/38 X |
| 4,489,990 | 12/1984 | Teramachi | 384/43 |
| 4,667,139 | 5/1987 | Hirai et al. | 310/13 |

*Primary Examiner*—Patrick R. Salce
*Assistant Examiner*—D. L. Rebsch
*Attorney, Agent, or Firm*—Pennie & Edmonds

[57] ABSTRACT

An X-Y table generally comprises a stationary bed and a table body disposed on the bed to be movable along guide member in X- and Y-axis directions in rectangular coordinates. The table body is driven by a linear motor to be disposed between the table body and the stationary bed, and the linear motor comprises a fixed member as a stator disposed on the upper surface of the stationary bed or the lower surface of the table body, first and second movable members disposed in operative association with the fixed member on the other surface, and a magnetic device for moving the first and second movable members. The fixed member is provided with fixed teeth formed in a lattice shape, with equal pitches in X- and Y-axis directions.

8 Claims, 7 Drawing Sheets

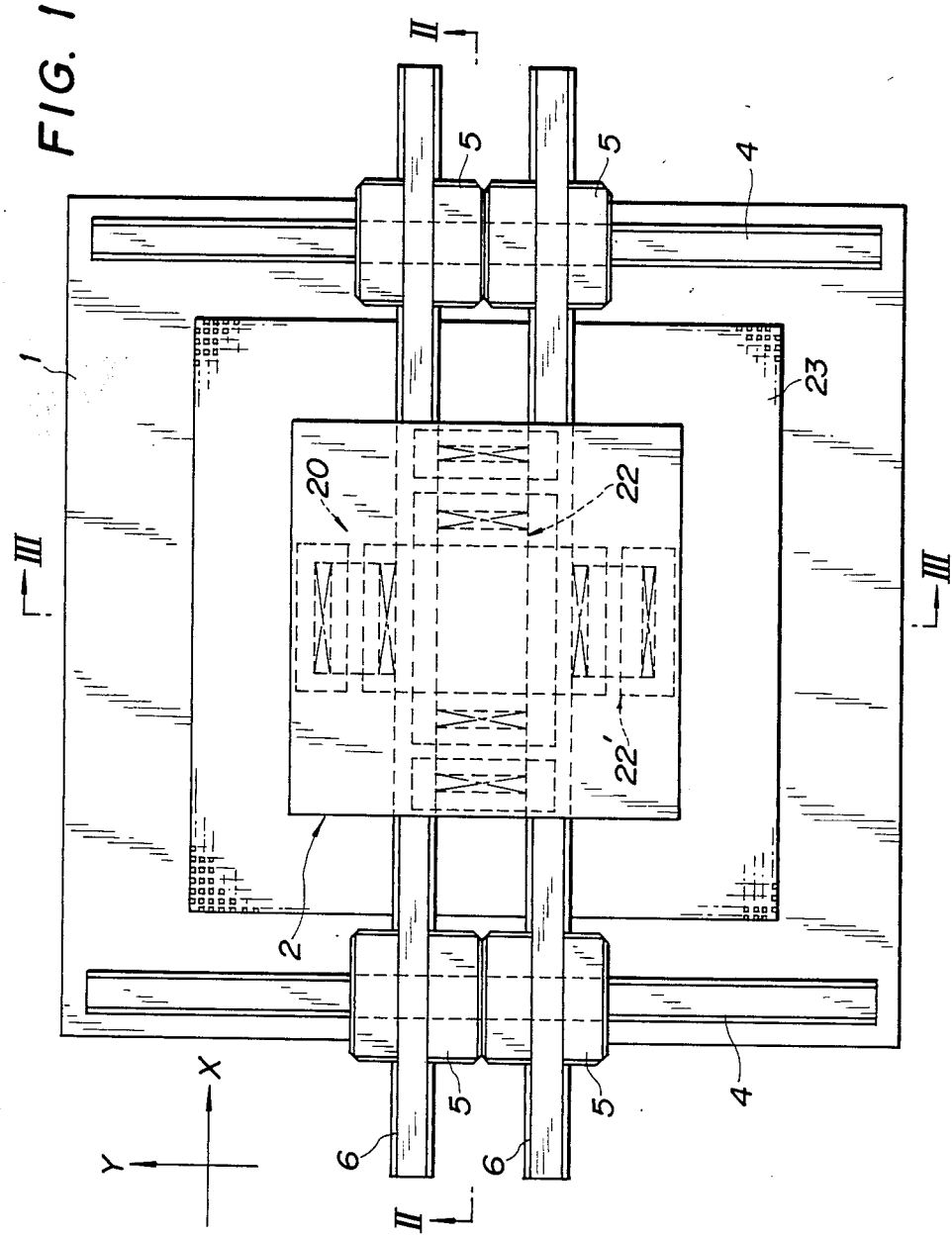

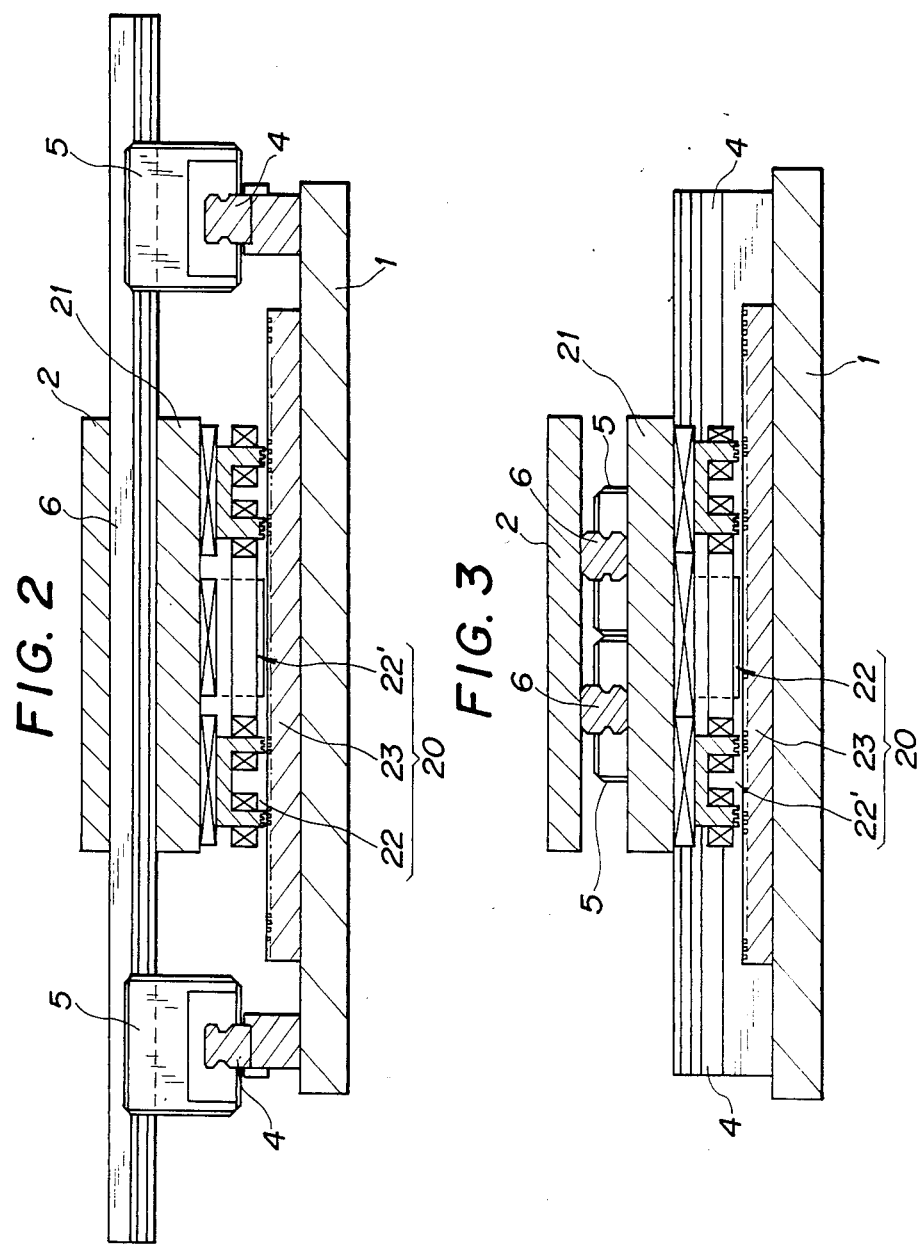

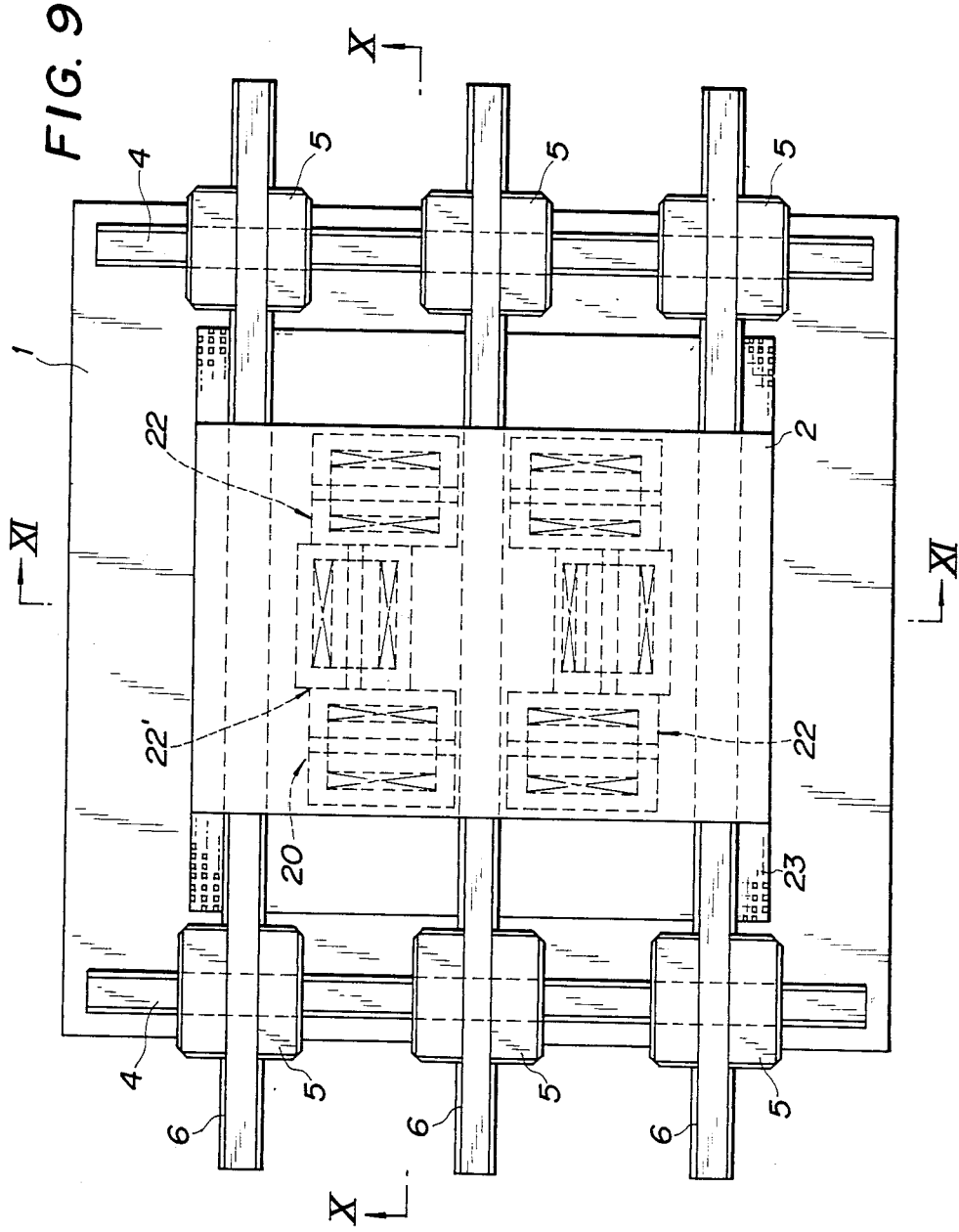

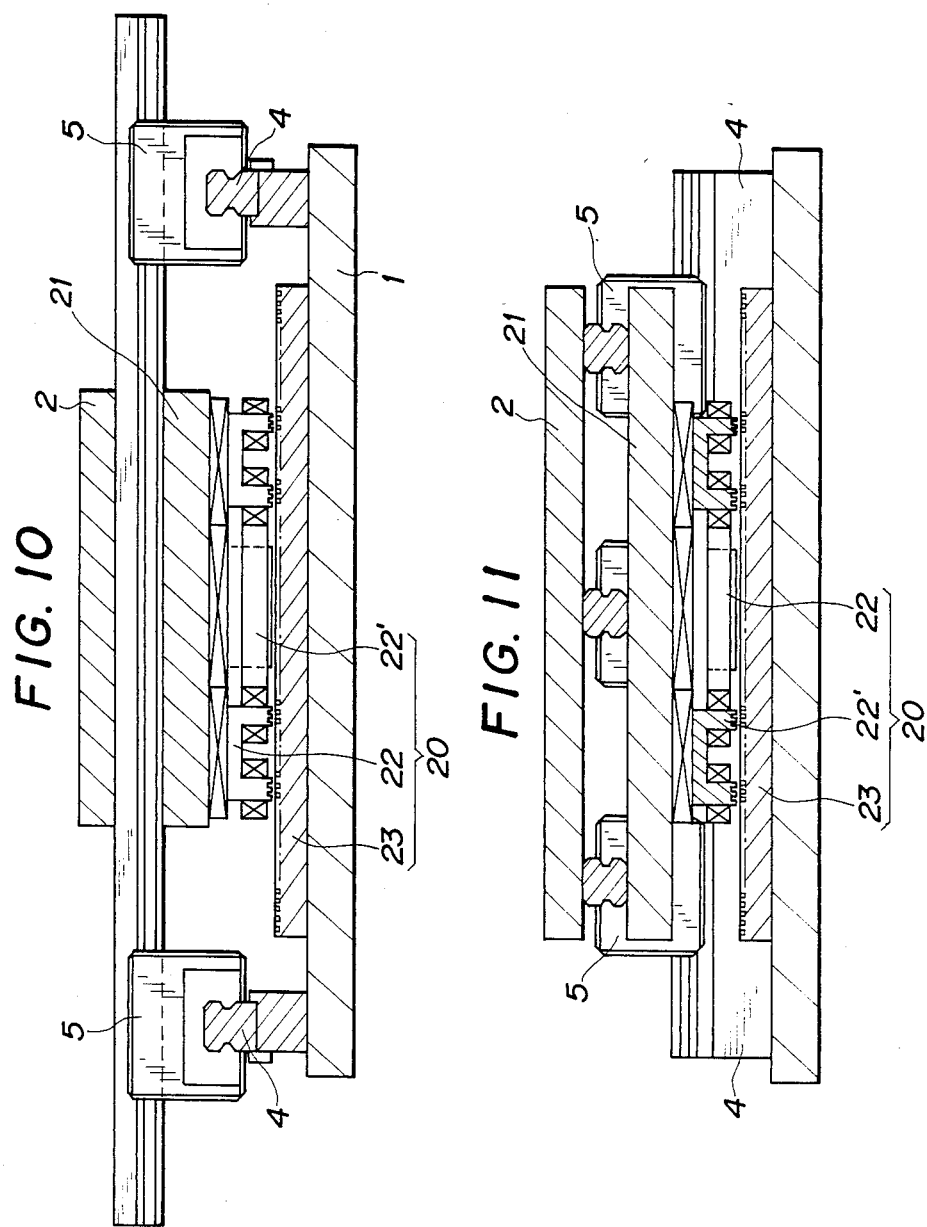

LINEAR MOTOR-DRIVEN X-Y TABLE

BACKGROUND OF THE INVENTION

The present invention generally relates to an X-Y table for precisely positioning a work and a tool incorporated in a machine tool, for example, and in particular, to an X-Y table employing a linear motor as a drive source therefor A typical conventional type of X-Y table has heretofore been arranged such that a table body mounted on a base through an intermediate saddle can slide in both the X- and Y-axis directions, orthogonal to each other in rectangular coordinates. The feed mechanism of the X-Y table has been constituted by a combination of ball screw and nut assemblies and rotary motors such as a servomotor or stepping motor.

More specfically, a ball screw shaft is rotatably disposed on the upper side of the base so as to extend in an X-axis direction, and a ball nut, which is screwed onto the screw shaft, is secured to the intermediate saddle. A rotary motor is operatively connected to one end of the ball screw shaft so that the intermediate saddle is fed in the X-axis direction along the ball screw shaft by the rotation of the motor. Similarly, a ball screw shaft is disposed on the upper side of the intermediate saddle so as to extend in the Y-axis direction perpendicular to the longitudinal axis of the first ball screw shaft, and a ball nut screwed onto the second ball screw shaft is secured to the lower side of the table body. A rotary motor is operatively connected to one end of the ball screw shaft so that the table body is fed in the Y-axis direction relative to the intermediate saddle by the rotation of the corresponding motor.

In the above-described prior-art X-Y table, however, if the ball screw and nut assemblies are reduced in pitch, the table body can be precisely fed, but the feeding speed thereof unavoidably becomes slow. Otherwise, the table body can be fed at a high speed by increasing the rotational speed of each of the ball screws. The high speed rotation of the ball screw, however, involves a problem such that the rotational speed of each of the ball screws should be limited below a dangerous level. There is a case where the ball screw is twisted by the rotational torque of the rotary motor or where a backlash occurs between a ball screw and a ball nut, thereby causing mechanical error and thus resulting in an unfavorable low degree of accuracy in the positioning of the table body.

The X-Y table of conventional type further provides disadvantages as described below.

The location of the rotary motors, ball screw and nut assemblies and so forth on a movable section such as the intermediate saddle or the table body makes heavy the movable section and large the inertia force thereof. Thus, every time the table body is stopped, the stop position tends to shift under the influence of this inertia force, so that the precision of positioning gradually deteriorates.

Since the table body and other members are disposed on the intermediate saddle, the saddle has to bear a load larger than that of the table body during the feed operation. As a result, the precision of the positioning operation in the X-axis direction is inferior to that in the Y-axis direction owing to the fact that the influence of inertia becomes larger when feeding the intermediate saddle than the table body.

The requirement of the location of a space for mounting the intermediate saddle or the like between the base and the table body increases the height of the table in the entirety. Hence the center of gravity is shifted to a higher position, thereby adversely affecting on the stability of feed. Furthermore, the rotary motors partially project from the side of the table, and thus, the overall size of the table is increased.

The prior art table further involves the following disadvantages. The necessity for a mechanism capable of converting the rotary motion of the rotary motor into linear motion causes such problems as an increase in the number of parts required, complexity of the structure, and troublesome works in assembly. If the table is frequently actuated, the ball screw and nut assemblies are heated, thereby lowering the precision of each of the ball screw and nut assemblies under the influence of thermal expansion.

SUMMARY OF THE INVENTION

Accordingly, it is a primary object of the present invention to provide a linear motor-driven X-Y table wherein the table body can be directly fed in the X- and Y-axis directions relative to a stationary bed by employing a linear motor provided with a fixed member having lattice-like fixed teeth as a drive source, thereby enabling high-speed and high-precision positioning.

It is another object of the present invention to provide a linear motor-driven X-Y table featuring a simple structure as well as a slim, compact size.

To these ends, the present invention provides an X-Y table comprising a stationary bed and a table body disposed on the stationary bed to be movable in X- and Y-axis directions along guide device in rectangular coordinates, wherein a linear motor is interposed between the stationary bed and the table body for driving the table body with respect to the stationary bed and said linear motor comprises a fixed member disposed on either one of an upper surface of the stationary bed and a lower surface of the table body, the fixed member being provided with fixed teeth located in the same plane, first and second movable members disposed in operative association with the fixed member on either one of the lower surface of the table body and the upper surface of the stationary bed, and magnetic device for moving the first and second movable members in X- and Y-axis directions in rectangular coordinates.

The above and other objects, features and advantages of the invention will become clear from the following description of the preferred embodiments, when the same is read in conjunction with the accompanying drawings.

BRIEF DESCRIPTION OF THE DRAWINGS

FIG. 1 is a top plan view of a first preferred embodiment of a linear motor-driven X-Y table in accordance with the present invention, partially showing some of the constituent parts in the interior which are not normally visible from the exterior;

FIG. 2 is a sectional view taken along the line II—II of FIG. 1;

FIG. 3 is a sectional view taken along the line III-—III of FIG. 1;

FIG. 9 is a top plan view of a second preferred embodiment of the linear motor-driven X-Y table in accordance with the present invention;

FIG. 10 is a sectional view taken along the line X—X of FIG. 9; and

FIG. 11 is a sectional view taken along the line XI—XI of FIG. 9.

DESCRIPTION OF THE PREFERRED EMBODIMENTS

Preferred embodiments of the linear motor-driven X-Y table of this invention will be explained hereinunder with reference to the accompanying drawings.

Figure 4:
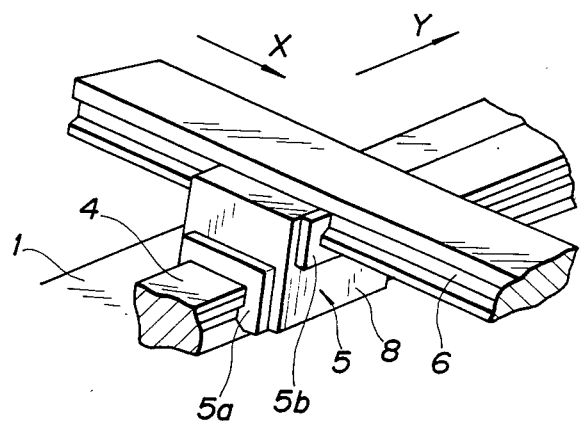
FIG. 4 is a perspective view diagrammatically showing one of the linear bearings which are mounted on the X-Y table shown in FIG. 1.

Referring to FIGS. 1 to 3 showing a first preferred embodiment of the linear motor-driven X-Y table of this invention, a table body 2 of substantially square shape in plan view is disposed above a stationary bed 1 in such a manner that the body 2 is vertically separated from and in face-to-face relationship with the bed 1, with an intermediate carriage 21 interposed therebetween, the table body 2 being capable of travelling relatively in the X- and Y- directions in rectangular coordinates which are orthogonal to each other. Specifically, Y-axis track members 4, 4 are disposed on both sides of the upper surface of the stationary bed 1 which extend in the Y-axis direction. On the other hand, the table body 2 has X-axis track members 6, 6 which extend in the X-axis direction and, at both ends, are carried on the Y-axis track members 4, 4 through linear bearings 5. Therefore, the table body 2 is capable of travelling along the X-axis track members 6, 6 in the X-axis direction and also along the Y-axis track members 4, 4 in the Y-axis direction. As shown in FIG. 4, each of the linear bearings 5 comprises a pair of bearing sections 5a, 5b which are disposed orthogonal to each other on the upper and lower sides of a bearing block 8. When the table body 2 is caused to travel in the X-axis direction, the X-axis track members 6, 6 are guided by the upper bearing sections 5b of the linear bearings 5. On the other hand, when the table body 2 is caused to travel in the Y-axis direction, the linear bearings 5 carrying the X-axis track members 6, 6 slide over the Y-axis track members 4, 4.

Figure 5:
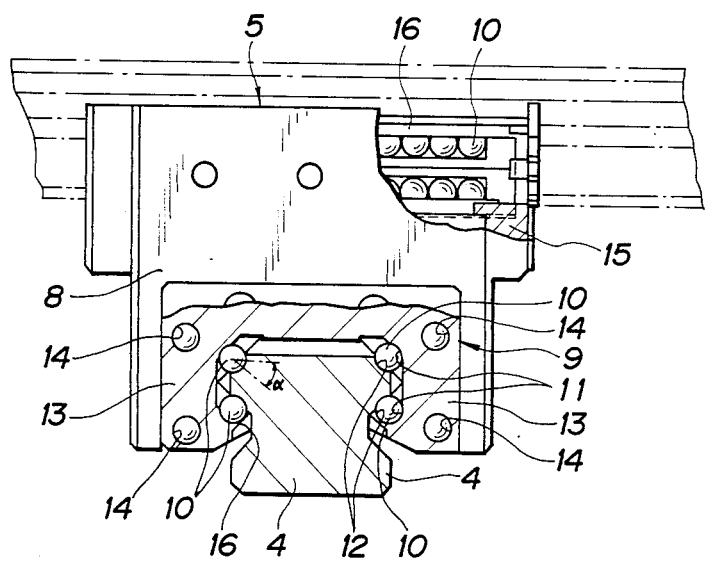
FIG. 5 is a front elevational view, partially broken away, of one of the linear bearings shown in FIG. 1.

The linear bearings 5 will be described below, particularly regarding the lower bearing section 5a, reference being made to FIG. 5 showing one of the linear bearings 5 in a partially broken away manner.

As shown, a bearing body 9 having a substantially inverted U-shaped cross-section is carried on the Y-axis track member 4 through loaded balls 10 as rolling members in such a manner that the body 9 can slide along the Y-axis track member 4. Ball-rolling grooves 11, 12 are formed in internal side surfaces of the bearing body 9 and in both side surfaces of the Y-axis track member 4, and the grooves 11, 12 extend along the track member 4 and in faceto-face relationship with each other. Skirt portions 13, 13 of the bearing body 9 are provided with ballrecirculating holes 14, 14 which extend longitudinally so as to be respectively connected to the pairs of ball-rolling grooves 11, 12. A pair of end plates 15, 15 is disposed at the lengthwise ends of the bearing body 9 so as to provide communication between the pairs of the ball-rolling grooves 11, 12 and the ball-recirculating holes 14, respectively. When the bearing 5 slides with respect to the Y-axis track member 4, the loaded balls 10 are caused to roll and circulate through the spaces defined between the ball-rolling grooves 11, 12 and the ball-recirculating holes 14. The bearing body 9 is provided with retainers 16 for guiding the loaded balls 10 and preventing them from dropping out. The angle of contact $\alpha$ between each of the ball-rolling grooves 11, 12 and the loaded balls 10 is set at about 45 degrees in this embodiment, but the angle $\alpha$ is not necessarily limited to this value, and may be selected within the range of 30 to 60 degrees.

As shown in FIGS. 2 and 3 a linear motor 20 is interposed between the table body 2 and the stationary bed 1. Specifically, first and second movable members 22, 22' are disposed below the table body 2, with the intermediate carriage 21 interposed between the members 22, 22' and the body 2, so as to extend in the X- and Y-axis directions, respectively.

The stationary bed 1 has, on the upper side thereof, a fixed member 23 as a stator including fixed teeth 23a which are arranged in the shape of a lattice in the same plane, the fixed teeth 23a being located in face-to-face relationship with the first and second movable members 22, 22'.

Figure 7A:
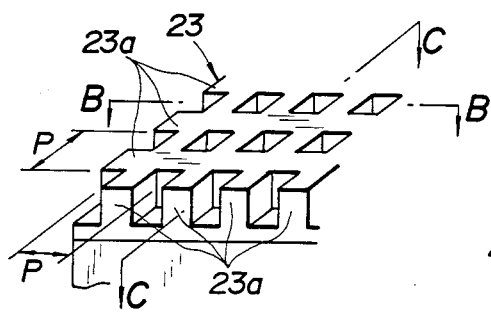
FIGS. 7A, 7C and 7D are an enlarged perspective view of a portion of the fixed member formed in a lattice shape incorporated in the X-Y table shown in FIG. 1, a sectional view taken along the line B—B of FIG. 7A and a sectional view taken along the line C—C of FIG. 7A, respectively.
Figure 7C:
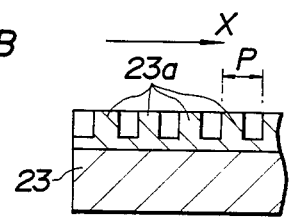
Figure 7B:
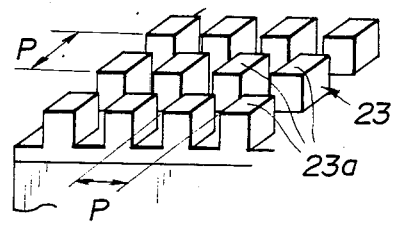
FIG. 7B is a view similar to FIG. 7A of a portion of the fixed member formed in a plurality of trains.
Figure 7D:
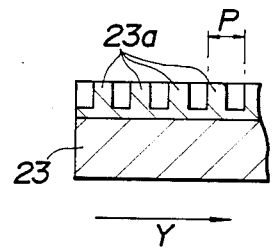

Referring to FIGS. 7A, 7C and 7D showing on an enlarged scale a portion of the fixed member 23, the member 23 comprises trains of the fixed teeth 23a formed in the X-axis or Y-axis direction at a predetermined pitch (P), the two groups of the trains crossing to each other perpendicularly in the shape of a lattice. The present invention is not limited to the above-described positional relationship between the fixed member 23 and the first and second movable members 22, 22'. The fixed member 23 may alternatively be located on the table body 2 and the first and second movable members 22, 22' may be provided on the stationary bed 1.

The diagrammatic construction of the linear motor 20 will be explained hereinunder with reference to the first movable member 22 and the fixed member 23 in conjunction with FIG. 6.

As shown in the Figure, each of the first and the second movable members 22, 22' has a central permanent magnet 24 and left and right magnetic cores 25, 26 disposed to face each other across the central permanent magnet 24. The magnetic core 25 (on the left side as viewed in FIG. 6) has first and second magnetic poles 27, 28 which are magnetized in N polarity by the central permanent magnet 24. The magnetic core 26 (on the right side as viewed in FIG. 6) has third and fourth magnetic poles 29, 30 which are magnetized in S polarity by the central permanent magnet 24.

Figure 6:
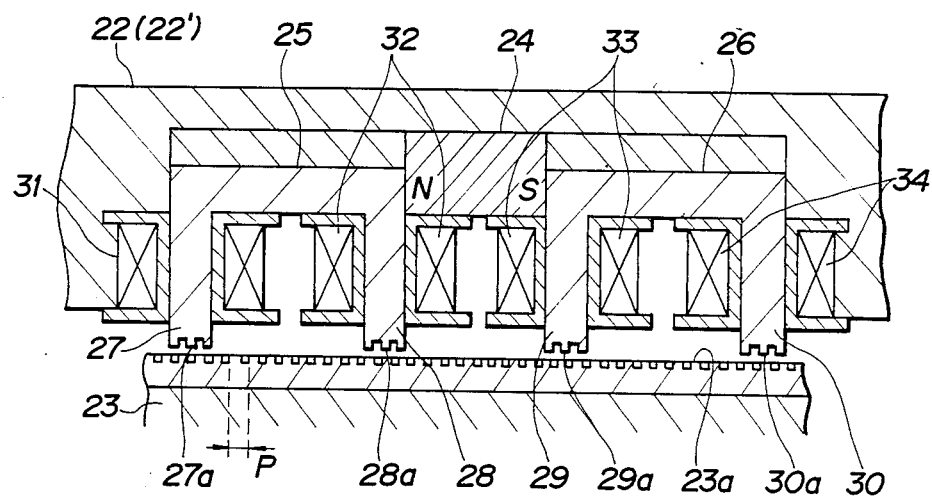
FIG. 6 is a diagrammatic sectional view showing on an enlarged scale the essential portion of a linear motor incorporated in the X-Y table shown in FIG. 1.

As shown in FIG. 6, a multiplicity of fixed teeth 23a, each having a rectangular cross-section and extending in the direction substantailly perpendicular to the longitudinal direction of the fixed member 23 are formed over the entire length of fixed member 23 at a constant pitch P. The first to fourth magnetic poles 27 to 30 are provided with pole teeth 27a to 30a at the same pitch as the teeth on the fixed member 23.

The first and second magnetic poles 27, 28 of N polarity carry, respectively, first and second coils 31, 32 wound therearound. These coils 31, 32 are connected in series so that they produce magnetic fluxes of counter-directions when electric pulse current is supplied to these coils from pulse generating means (not shown) electrically connected to these coils 31, 32.

Similarly, the third and fourth magnetic poles 29, 30 of S polarity carry, respectively, third and fourth coils 33, 34 wound therearound. These coils 33, 34 are connected in series so that they produce magnetic fluxes of counter directions when electric pulse current is supplied to these coils from the pulse generating means (not shown) electrically connected to these coils 33, 34. For the sake of simplicity of explanation, it is assumed that the phase of the pole teeth 28a of the second magnetic pole 28 is offset from the phase of the pole teeth 27a of the first magnetic pole 27 by an amount corresponding to ½ pitch, i.e., P/2, and that the phase of the pole teeth 29a of the third magnetic pole 29 is offset from the phase of the pole teeth 30a of the fourth magnetic pole 30 by an amount corresponding to ½ pitch, i.e., P/2. It is also assumed that the pole teeth 29a, 30a of the third and fourth magnetic poles 29, 30 of S polarity are offset in phase from the pole teeth 27a, 28a of the first and second magnetic poles 27, 28 of N polarity by an amount corresponding to ¼ pitch, i.e., P/4.

The principle of operation of the linear pulse motor incorporated in this embodiment will be explained with specific reference to FIGS. 8A to 8D which schematically illustrate the operation of this linear pulse motor.

Figure 8A:
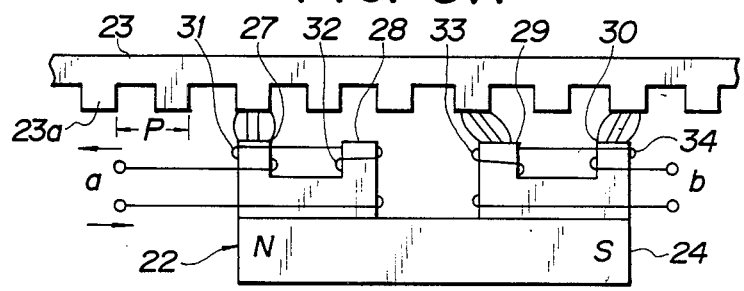
FIGS. 8A to 8D are diagrammatic elevational views of the linear motor, showing the principle of operation thereof.
Figure 8B:
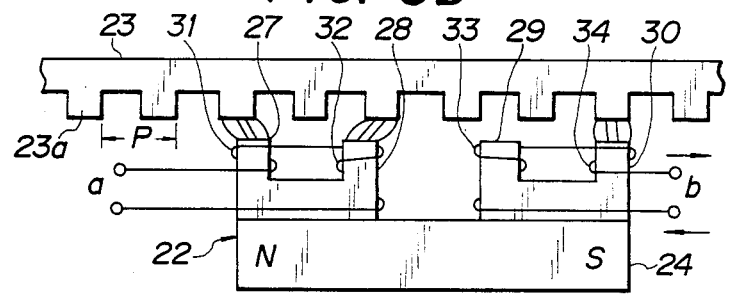
Figure 8C:
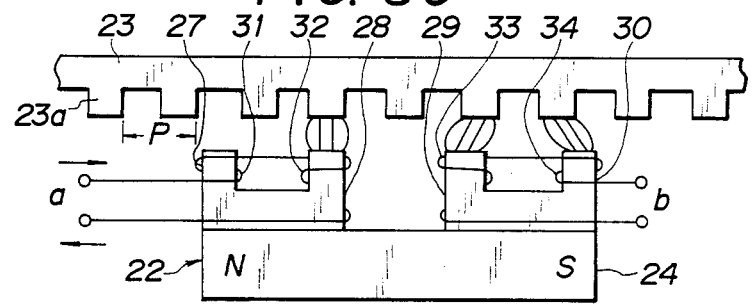
Figure 8D:
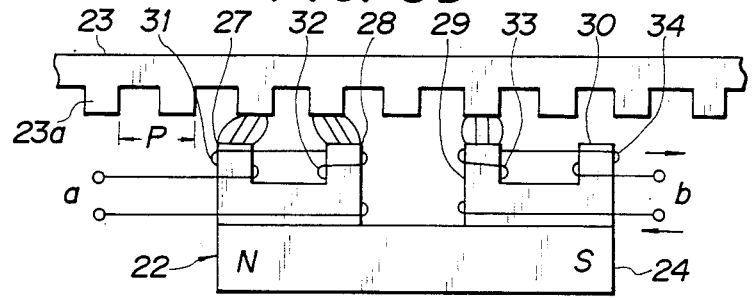

The first and second coils 31, 32 receive pulses through terminals a, while the third and fourth coils 33, 34 receive pulses through terminals b. In FIG. 8A, the pulse current is supplied to the terminals a in such a direction as to excite the first magnetic pole 27 (Mode (1)). As shown in FIG. 8B, the pulse current is supplied to the terminals b in such a direction as to excite the fourth magnetic pole 30 (Mode (2)). As shown in FIG. 8C, the pulse current is supplied to the terminals a in such a direction as to excite the second magnetic pole 28 (Mode (3)). Finally, in FIG. 8D, the pulse current is supplied to the third magnetic pole 29 in such a direction as to excite the third magnetic pole 29 (Mode (4)).

Table 1 shows the conditions of the magnetic force generated by each magnetic pole in Modes (1) to (4).

TABLE 1

| Mode | Magnetic force generating conditions | | Stable position |
|---|---|---|---|
| (1) | First pole 27: | flux from magnet 24 + flux from coil 31 | First pole 27 |
| | Second pole 28: | flux from magnet 24 − flux from coil 32 = 0 | |
| | Third and fourth poles 29, 30: | magnetic forces by magnet 24 balanced | |
| (2) | First and second poles 27, 28: | magnetic forces by magnet 24 balanced | Fourth pole 30 |
| | Third pole 29: | flux from magnet 24 − flux from coil 33 = 0 | |
| | Fourth poles 30: | flux from magnet 24 + flux from coil 34 | |
| (3) | First pole 27: | flux from magnet 24 − flux from coil 31 = 0 | Second pole 28 |
| | Second pole 28: | flux from magnet 24 + flux from coil 32 | |
| | Third and fourth poles 29, 30: | magnetic forces by magnet 24 balanced | |
| (4) | First and second poles 27, 28: | magnetic forces by magnet 24 balanced | Third pole 29 |
| | Third pole 29: | flux from magnet 24 + flux from coil 33 | |
| | Fourth pole 30: | flux from magnet 24 − flux from coil 34 | |

As will be seen from Table 1, in Mode (1), the first magnetic pole 27 of N polarity exerts the strongest magnetic force, so that the first movable member 22 is held in a stable state by the magnetic attraction force acting between the first magnetic pole 27 and the corresponding tooth 23a of the fixed member 23. On the other hand, the third and fourth magnetic poles 29, 30 of S polarity are offset by ¼ pitch from adjacent teeth 23a on the fixed member 23.

In Mode (2), the magnetic pole 27 does not produce force any more and, instead, the fourth magnetic pole 30 of S polarity produces the strongest force, so that the first movable member 22 is relatively moved by a distance corresponding to ¼ pitch, i.e., P/4, such that the fourth magnetic pole 30 comes into phase with the adjacent tooth 23a on the fixed member 23. Meanwhile, the first and second magnetic poles 27, 28 of N polarity are offset from the adjacent tooth 23a on the fixed member 23 by a distance corresponding to ¼ pitch, i.e., P/4.

In Mode (3), the second magnetic pole 28 of N polarity produces the strongest magnetic force, so that the first movable member 22 is relatively moved by a distance corresponding to ¼ pitch, i.e., P/4, such that the second magnetic pole 28 comes into phase with the adjacent tooth 23a on the fixed member 23. On the other hand, the third and fourth magnetic poles 29, 30 of S polarity are offset from the adjacent teeth 23a on the fixed member 23 by a distance corresponding to ¼ pitch, i.e., P/4.

In Mode (4), the third magnetic pole 29 of S polarity exerts the strongest force, so that the first movable member 22 is relatively moved by a distance corresponding to ¼ pitch, i.e., P/4, such that the magnetic pole 29 comes into phase with the adjacent tooth 23a on the fixed member 23.

Thereafter, the operation proceeds in Mode (1) again so that the first magnetic pole 27 of N polarity comes to produce the strongest force. As a result, the first movable member 22 is further moved by a distance corresponding to ¼ pitch, i.e., P/4, thus resuming the state shown in FIG. 8A. In this way, the first movable member 22 travels a distance corresponding to ¼ pitch in each pulse cycle by sequential repetition of Modes (1) to (4), and the above-described process is applied to the operation of the second movable member 22' as well.

The foregoing description concerns a single-phase excitation. However, the linear motor incorporated in this invention may be driven by means of the two-phase excitation system which is arranged to be consistently excited by two-phase current. Alternatively, 1-2 phase excitation system may be adopted in which single-phase and two-phase currents are alternately applied to cause excitation.

The X-Y table having the above-described construction is driven in the following manner.

When the table body 2 is to be fed in the X-axis direction, the first movable member 22 is supplied with a predetermined number of pulses from a pulse generating means (not shown). A magnetic attraction force acts between the first movable member 22 and the corresponding fixed teeth 23a forming the teeth trains extending in the X-axis direction of the fixed teeth 23a which are together formed in the shape of a lattice on the fixed member 23, thereby feeding the table body 2 to a predetermined position. On the other hand, when the table body 2 is to be fed in the Y-axis direction, the second movable member 22' is supplied with a predetermined number of pulses from the pulse generating means (not shown). A magnetic attraction force acts between the second movable member 22' and the corresponding fixed teeth 23a forming the teeth trains extending in the Y-axis direction of the fixed teeth 23a which are together formed in the shape of a lattice on the fixed member 23, thereby feeding the table body 2 to a predetermined position. Also, when the table body 2 is to be fed to a predetermined position in the system of X and Y coordinates, the first and second movable members 22, 22' are at the same time supplied with the number of pulses corresponding to the degree of travel of each of the members 22, 22', thereby enabling the table body 2 to travel in diagonal directions.

Since the overall weight of the table body 2 is reduced, the inertia force is made small when the body 2 is to be fed and starting and stopping responses are thus improved. It is therefore possible to quickly position the table body 2 and feed the body 2 at higher speed as the pulse frequency is increased. When the table body 2 is to be stopped, the influence exerted thereupon by the inertia force due to the stoppage is controlled so as to remain at a low level and enable the accurate positioning of the table body. Thus, the table body 2 is precisely held in a stop position by the magnetic force acting between the first and second movable members 22, 22' and the fixed member 23.

Since the table body 2 is slidably supported through the linear bearings 5, the body 2 can be smoothly moved, owing to the low degree of sliding resistance. The clearance between the table body 2 and the stationary bed 1 is maintained at a constant value, so that it is possible to prevent the formation of interference between the table body 2 and the stationary bed 1. The gap between the first and second movable members 22, 22' and the fixed member 23, which are interposed between the stationary bed 1 and the table body 2, is also maintained at a constant value, and the propulsion force is thereby maintained at a constant level at all times, with the result that a stable feeding performance can be achieved. In addition, since the gap between the first and second movable members 22, 22' and the fixed member 1 can also be maintained at a fixed value, it becomes possible to reduce the width of the gap, thus obtaining a large propulsion force and a large force for stopping the table body 2 and retaining it in a stationary state. Furthermore, if a preload is applied to the loaded balls 10 of each of the linear bearings 5, rigidity is enhanced. Hence, a large load can be borne by the X-Y table, and the table body 2 is substantially free from deformation even when an impact load is applied thereto, so that it is possible to further reduce the gap between the first and second movable members 22, 22' and the fixed member 23, thereby obtaining a large propulsion force and a large retaining force, as compared with the conventional X-Y table. The angle α of contact between each of the ball-rolling grooves 11, 12 and the loaded balls 10 is set at about 45 degrees, so that any load applied to the linear bearings vertically or laterally can be born substantially uniformly.

In the embodiment described hereinbefore, although the fixed member 23 includes the fixed teeth 23a arranged in a lattice shape in the same plane, in an alternation as shown in FIG. 7B, the fixed teeth 23a may be constituted by a plurality of rows or trains of pieces each having substantially the rectangular parallelopiped configuration. The alternation attains of course substantially the same effect as that referred to hereinbefore with respect to the lattice shaped teeth and has advantages in the simple manufacture of the same and in accuracy positioning the table body 2 even when a large load is applied thereto due to enhancing a retaining force between the movable members 22, 22' and the fixed member 23.

The second preferred embodiment of the present invention will be described below with reference to FIGS. 9 to 11, in which like reference numerals are used for the sake of simplicity to denote like or corresponding elements relative to those in the first embodiment described hereinbefore.

The second embodiment is different from the first one in the following respects. The table body 2 is formed in such a manner that the length of the Y-axis direction is longer than that of the first embodiment, and the area of the surface of the table body 2 becomes accordingly greater. Three X-axis track members 6 are provided and, in addition, a pair of first movable members 22 for driving the table body 2 in the X-axis direction are arranged in parallel to each other in the same direction. Therefore, it is possible to duplicate the forces employed for driving the table body 2 in the X-axis direction and for stopping and retaining the same in a predetermined position. Since the other features and advantages of the second embodiment are substantially the same as those of the first one, further explanation will be omitted for the sake of simplicity.

It should be noted that a given number of the first and second movable members may be provided and the number of Y-axis track members 4 may also be selected as occasion demands.

The linear motor-driven X-Y table according to the present invention, which features the arrangement and operation described above, offers the following various advantages.

The table body is fed in the X- and Y-axis directions in rectangular coordinates by means of the linear motor comprising the first, second movable members and the fixed member having the fixed teeth which are arranged in the shape of a lattice in the same plane, these members being interposed between the stationary bed and the table body. Therefore, unlike the prior-art X-Y table, there is no limitation in terms of the speed of the ball and nut assemblies. Hence, it is possible to feed the table body at high speed by enhancing the pulse frequency input to the linear motor. Since there is no need to incorporate any motion-converting mechanism for converting rotary motion to linear motion, as is required by the prior art, the X-Y table of this invention is free from such mechanical errors as might be caused by the twisting of ball screw shafts, thus the positioning accuracy being further improved. Since there is no need to employ the ball screw and nut assembly in the movable sections, the overall weight can be further reduced, resulting in a reduction in the influence of inertia and thereby enabling high-precision positioning. The present invention does not involve the use of an intermediate saddle as has been incorporated in the conventional type of X-Y table and makes use of the above-mentioned fixed member having the fixed teeth which are arranged in the shape of a lattice in the same plane, whereby the table body is fed in the X- and Y-axis directions thereof relative to the stationary bed. In consequence, the same level of load is applied in the X- and Y-axis directions in which the table body is caused to travel, and thus the X-Y table is affected by the same level of inertia in both the X-and Y-axis directions. The prior art X-Y table involves disadvantage in that a certain degree of difference occurs between the degrees of accuracy of positioning in the X- and Y-axis directions under the influence of the difference in inertia which is attributable to the difference between loads applied while carrying the table body in the X- and Y-axis directions, respectively. However, the present invention, as described above, is capable of carrying out positioning operations in the X- and Y-axis directions with the same precision. In addition, since there is no need to provide an intermediate saddle, ball screw and nut assembly or the like, the overall height of the X-Y table of the invention is lower than that of the prior art. The interposition of the linear motor between the table body and the stationary bed enables a slim and compact X-Y table having its center of gravity at a lower and hence stable position. Furthermore, since the X-Y table of the invention has a simple structure in which the linear motor is incorporated in the space between the table body and the stationary bed, the present invention possesses a variety of advantages in that the entire structure can be simplified and the number of parts greatly reduced.

While the above provides a full and complete disclosure of the invention, various modifications, alternative constructions and equivalents may be employed without departing from the true spirit and scope thereof. The above description and illustrations should not be construed as limiting the scope of the invention, which is defined by the appended claims.

What is claimed is:
1. Apparatus comprising:
   (a) a stationary bed;
   (b) a table body disposed juxtaposed to said stationary bed to be movable adapted for movement in both X-and Y-axis directions in an X-Y coordinate system;
   (c) linear bearing means supporting said table body for movement providing
     (1) a first track member secured to an upper surface of said stationary bed and extending in one of said directions,
     (2) a second track member extending in the other of said directions, said second track member supporting said table body, and
     (3) bearing body means operatively engaged with said first and second track members, said bearing body means permitting ease in sliding movement of said second track member along and in directions of said first track member and in directions perpendicular thereto; and
   (d) a linear motor interposed between said stationary bed and said table body for driving said table body with respect to said stationary bed, said linear motor providing
     (1) a fixed member disposed on one of an upper surface of the stationary bed and a lower surface of the table body, said fixed member formed with fixed teeth located in a single plane.
     (2) a first and second movable members also disposed in a single plane in operative association with said fixed member on the other of the lower surface of the table body and the upper surface of the stationary bed, one of said first and second members located along one of said directions and the other of said members located along the other of said directions, and
     (3) magnetic means for moving said first and second movable members relative to said fixed member within said X-Y coordinate system.

2. Apparatus according to claim 1 wherein said teeth of the first member are formed in a lattice shape with the same pitch in both the X- and Y-axis directions.

3. Apparatus according to claim 1 wherein said teeth of the first member are formed in a plurality of rows of rectangular parallelopiped pieces with the same pitch in both the X- and Y-axis directions.

4. Apparatus according to claim 1 wherein said magnetic means comprises a plurality of magnetic pole members, coils wound around said pole members, respectively, and a pulse generator electrically connected to said coils.

5. Apparatus according to claim 1 wherein said first track member comprises a pair of tracks, and said second track member comprises at least a pair of tracks.

6. Apparatus according to claim 1 wherein said bearing body means is formed by a first and second bearing body operatively engaged with said first and second track members, respectively, through linear bearing means.

7. Apparatus according to claim 6 including a plurality of grooves formed in opposed relation in both said first and second track members and said first and second bearing body, and a plurality of balls rolling within passages defined by said grooves whereby said bearing body means operatively engages said first and second track members.

8. Apparatus of claim 7 wherein a contact angle between said rolling balls and each ball rolling groove is substantially about 45°.

* * * * *